United States Patent
Woolf et al.

[11] Patent Number: 6,151,778
[45] Date of Patent: Nov. 28, 2000

[54] APPARATUS AND METHOD FOR ROLL FORMING GEARS

[75] Inventors: Richard Mark Woolf, Cincinmnati; Juan R. L. Trasorras, Dayton, both of Ohio

[73] Assignee: Federal-Mogul World Wide, Inc., Southfield, Mich.

[21] Appl. No.: 09/475,725

[22] Filed: Dec. 30, 1999

Related U.S. Application Data

[62] Division of application No. 09/237,290, Jan. 25, 1999.

[51] Int. Cl.[7] ....................................... B21H 5/02
[52] U.S. Cl. ........................................ 29/893.32
[58] Field of Search ............................ 72/102, 103, 109; 29/90.6, 893.32; 409/32

[56] References Cited

U.S. PATENT DOCUMENTS

| | | |
|---|---|---|
| Re. 31,116 | 1/1983 | Anderson . |
| 1,001,799 | 8/1911 | Anderson . |
| 1,240,919 | 9/1917 | Anderson . |
| 1,642,179 | 9/1927 | Schurr . |
| 1,847,848 | 3/1932 | Ragan ................... 29/90.6 |
| 1,955,082 | 4/1934 | Miller .................... 29/90.6 |
| 2,423,932 | 7/1947 | Finzel . |
| 2,641,088 | 6/1953 | Wilcox ................... 29/90.6 |
| 2,886,990 | 5/1959 | Bregi . |
| 2,934,980 | 5/1960 | Grob et al. . |
| 3,159,062 | 12/1964 | Goodwill . |
| 3,631,704 | 1/1972 | Leonard et al. . |
| 3,695,078 | 10/1972 | Bruinsma . |
| 3,735,618 | 5/1973 | Zook . |
| 3,914,083 | 10/1975 | Arai . |
| 3,985,012 | 10/1976 | Deprez . |
| 4,045,988 | 9/1977 | Anderson . |
| 4,212,572 | 7/1980 | Vu-Do . |
| 4,305,190 | 12/1981 | Flair . |
| 4,394,421 | 7/1983 | Chmura et al. . |
| 4,583,271 | 4/1986 | Diener . |
| 4,708,912 | 11/1987 | Huppman . |
| 5,301,528 | 4/1994 | Hofmann et al. . |
| 5,711,187 | 1/1998 | Cole et al. . |

FOREIGN PATENT DOCUMENTS

| | | | |
|---|---|---|---|
| 64-58421 | 3/1989 | Japan ....................... | 409/32 |
| 965582 | 10/1982 | Russian Federation ...... | 72/102 |
| 1125952 | 9/1968 | United Kingdom . | |

*Primary Examiner*—Lowell A. Larson
*Attorney, Agent, or Firm*—Reising, Ethington, Barnes, Kisselle, Learman & McCulloch, P.C.

[57] ABSTRACT

A wrought or powder metal gear preform is mounted for rotation about a first axis and then driven in meshing engagement with a roll forming die supported for rotation about a second axis transverse to the first axis. The roll forming die includes a helical worm thread that moves radially as well as axially across the face of the preform teeth to displace the material of the preform. In the case of a powder metal preform, displacement of the material acts to densify the teeth, whereas in the case of a wrought preform the gear teeth are burnished. The preform and roll forming die are separately driven to control densification.

4 Claims, 3 Drawing Sheets

APPARATUS AND METHOD FOR ROLL FORMING GEARS

This application is a division of application Ser. No. 09/237,290, filed Jan. 25, 1999.

BACKGROUND OF THE INVENTION

1. Technical Field

This invention relates generally to roll forming of gears and more particularly to roll form densification of powder metal gear preforms and roll form burnishing of wrought gears.

2. Related Prior Art

It is known to produce gears from wrought (i.e., cast and/or forged) metal blanks and from pressed and sintered powder metal preforms. For many applications, powder metal gears offer a low cost alternative to wrought gears. Powder metal gears can be formed to near net shape, avoiding costly machining required to produce wrought gears. However, a principle disadvantage associated with powder metal gears made according to conventional practice is that they do not possess the high strength characteristic of wrought gears. The lower strength of powder metal gears is often attributed to low density resulting from traditional manufacturing processes. Consequently, powder metal gears generally have not been regarded as a practical alternative to wrought gears in applications such as transmission gear components which call for high strength precision gears.

The conventional manner of forming powder metal gears involves first pressing and sintering a preform to near net shape and thereafter roll forming the preform to density the teeth. The densification is carried out by enmeshing the powder metal preform with a toothed roll forming gear with sufficient force to densify the preform teeth. U.S. Pat. No. 5,711,187 discloses the general arrangement wherein a spur gear powder metal preform is supported on a spindle for free rotation about a first axis. A spur gear roll forming tool is driven about a second, parallel axis and meshes with the preform to in turn rotate the preform. Greater force is exerted on the driven side of the preform teeth than on the opposite coast side, resulting in corresponding variation in the densification of the teeth. The same difficulties arise in roll forming helical gears.

Further variation can occur as a result of the nature in which the gear teeth of the tool and preform interact. The teeth of the forming tool initially engage the driven side of the preform teeth and advance radially inwardly, exerting a radially inward wiping or rolling force on the driven side to effect densification. Through further rotation, the teeth of the tool confront the coast side and advance radially outwardly, exerting a lesser and oppositely directed wiping or rolling force on the coast side, leading to the variation in density. Some of the problem can be alleviated by reverse roll forming in the opposite direction, however this operational step adds extra time, cost and complexity to the forming of gears and may not eliminate the problem entirely.

In roll forming involute teeth of powder metal preforms, a trial and error approach is typically used to determine the proper sizing and tooth geometry of the rolling die need to produce the desired tooth profile, particularly an involute profile, as there is no mathematical basis known using current technology. If it is desired to alter the densification profile of the preform teeth, it is necessary to change roll forming dies or alter the starting profile of the preform teeth. As disclosed in the aforementioned '187 patent, it is sometimes necessary to employ a number of different forming die configurations to generate a desired densified tooth profile.

A similar technique is often used to burnish the teeth of wrought gears with similar difficulties being encountered with respect to burnishing as are encountered with powder metal densification. The solution thus far has been to reverse roll form the wrought gears, but at the cost of adding an extra step of complexity to the gear forming operation.

An object of the present invention is to provide a gear roll forming apparatus and method which simplifies the roll forming operation of powder metal and wrought gears while minimizing or altogether eliminating some or all of the disadvantages associated with known traditional processes.

SUMMARY OF THE INVENTION AND ADVANTAGES

A method of roll forming gear teeth is provided comprising supporting a gear preform for rotation about a first axis, supporting a forming roll having a helical worm thread for rotation about a second axis transverse to the first axis, and driving the forming roll and gear preform in rolling engagement with one another with sufficient force to displace material of the preform and thereby impart a finished gear tooth pattern to the preform.

The roll forming method is particularly useful for densifying the teeth of powder metal gears and burnishing the teeth of wrought gears.

The helical worm thread of the forming roll works radially up and down as well as axially across the teeth of the gear preform on both the drive and coast sides of the teeth providing high, uniform densification in a single pass, eliminating the need and extra processing step of reverse roll forming as is commonly done when employing conventional forming roll techniques.

The invention also provides an apparatus for roll forming gears comprising a workpiece support spindle for supporting a toothed gear preform for rotation about a first axis, a roll forming die having a helical worm thread, and a tool spindle mounting the die for driven rotation about a second axis transverse to the first axis. The worm thread of the die meshes with and densities the teeth of the preform. The apparatus provides the same advantages discussed above with respect to the method of the invention.

The invention further provides a method of modifying a gear cutting machine tool, normally equipped with a gear cutting die having cutting features which remove material from a gear blank, to facilitate roll form densification of the teeth of sintered powder metal gear preforms. The method comprises supporting a sintered powder metal preform having preformed teeth on the machine tool for rotation about a first axis. The cutting die is replaced with a roll forming die supported on the tool about a second axis transverse to the first axis of the preform. The roll forming die has a roll forming surface that is substantially free of cutting features that would act to remove preform material. The die and preform are driven about their axes in forced meshing engagement, and the relative movements of the die and preform are controlled to density the teeth of the preform. The invention thus provides a simple technique for roll forming powder metal gears by a simple, low cost modification to an existing machine tool used to cut gears from wrought gear blanks. A significant advantage that this method offers is that powder metal gears can be densified using similar machine tool programming already employed for cutting wrought gears based on existing mathematical principles which, until now, have been reserved for gear cutting operations. Such obviates the current trial and error approach to roll form densifying powder metal gears.

Another significant advantage that this invention offers is that it enables a number of different tooth profiles or densification profiles to be achieved without the need for multiple roll forming dies and die changes. Tooth shape and densification profiles can be altered by simply controlling the relative drive of the roll forming die and the preform. Without changing dies, an involute helical tooth profile can be achieved, as well as crowned powder metal gear teeth. It will be appreciated that significant cost and time savings is recognized by the subject densifying processes.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
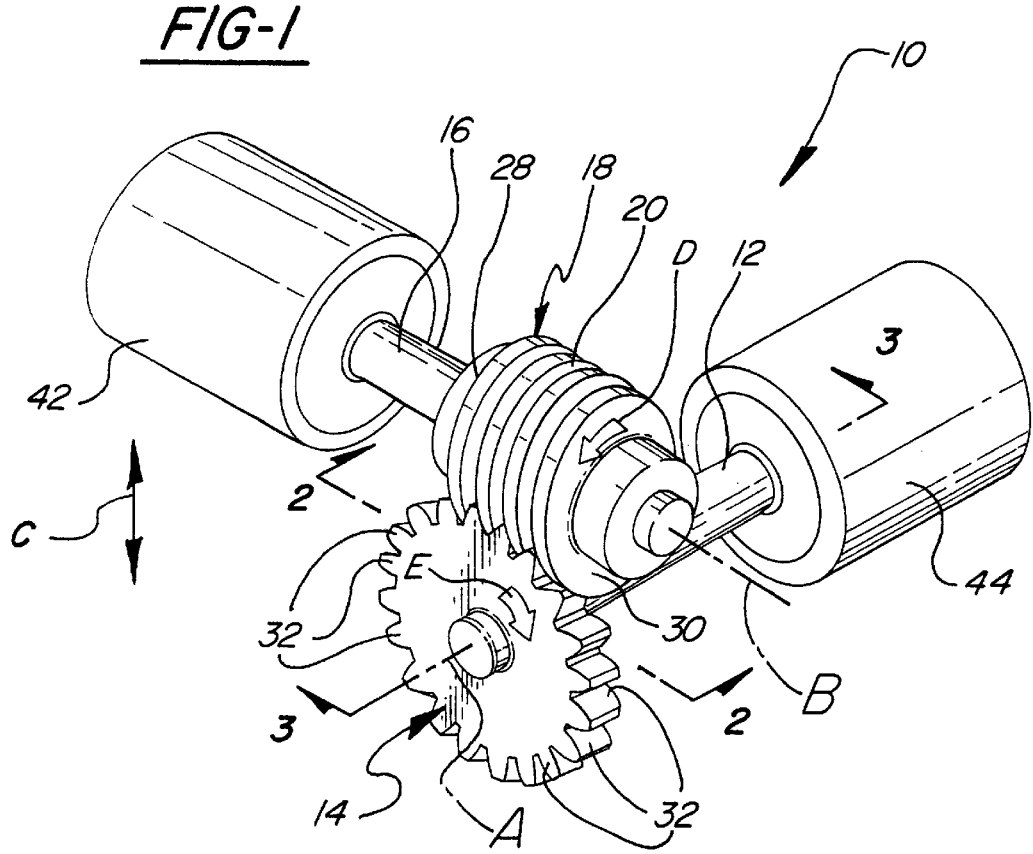
FIG. 1 is a schematic perspective view of a gear roll forming apparatus constructed according to one embodiment of the invention.

A gear roll forming apparatus constructed according to a presently preferred embodiment of the invention is indicated generally at 10 in FIG. 1 and comprises a workpiece spindle 12 having a rotation axis A for mounting a gear workpiece or preform 14 for rotation about the axis A. The apparatus further includes a tool spindle 16 adjacent the spindle 12 having a rotation axis B transverse to the rotation axis A. A roll forming die 18 is mounted on the spindle 16 for rotation about the axis B in operative working relation relative to the preform 14. The axis B is skewed relative to the axis A (that is, axes A and B are nonparallel and nonintersecting).

Figure 2:
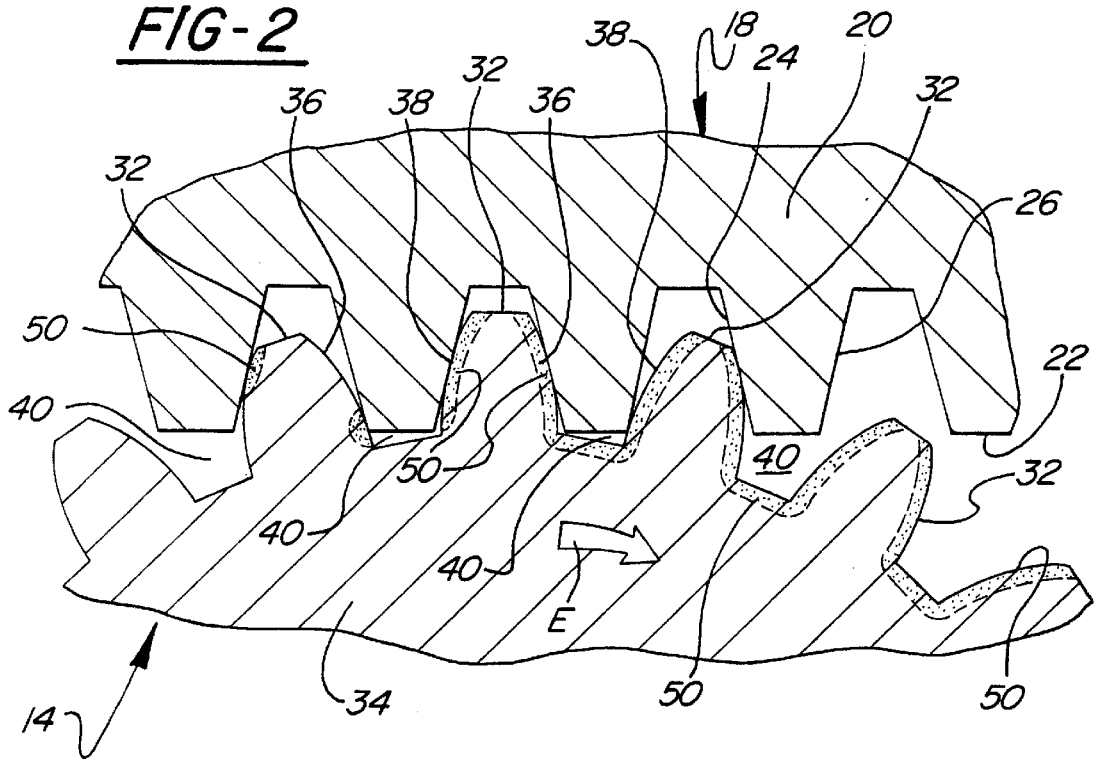
FIG. 2 is an enlarged fragmentary sectional view taken generally along lines 2—2 of FIG. 1.

As shown best in FIGS. 1 and 2, the forming die 18 comprises a generally cylindrical body 20 having peripheral roll forming teeth in the form of a helical worm thread 22. The thread 22 has opposed leading and trailing forming faces 24, 26 (with respect to the direction of rotation) extending helically about the cylindrical body 20 of the die 18 continuously between opposite axial ends 28, 30 of the die 18. The forming thread 22 is free of any cutting teeth or features that would act to cut, shear or remove material from the preform 14 in the sense of a gear cutting operation. Rather, the objective of the forming thread 20 is to displace the material of the preform in order to densify or burnish the preform as will be discussed below. The forming thread 22 is preferably a single start thread, although multiple start threads are contemplated by the invention to the extent they would perform the same or similar function of densifying or burnishing the preform in the same or similar way. The number of worm threads, $N_w$ in a die 18 having a single start thread is one, whereas $N_w$ is greater than one for dies having multiple start threads (e.g., 2 or 3).

The gear preform 14 is initially formed in the general shape of a gear having a number, $N_g$, of gear teeth 32 extending radially from a preform body 34. Each tooth 32 has opposite leading 36 and trailing 38 faces with respect to the direction of rotation of the preform during roll forming, and each tooth 32 is separated circumferentially from an adjacent tooth by a space 40. The teeth 32 are formed initially slightly oversized relative to a final finished dimension after roll forming to account for the slight dimensional changes that occur as a result of the roll forming operation. Any of a number of gear teeth profiles may be formed, including spur, helical, involute and/or crowned.

The gear preform 14 may be fabricated either of power metal which has been compacted and sintered, or may comprise a wrought gear preform formed by such conventional techniques as casting, forging, extruding, hobbing, shaping, or the like. The selection of material for the powder metal preform is dependent in part on the particular end application. In an application such a transmission gear component for example, a high strength steel alloy would be suitable. The same material selection criteria would apply with respect to metallic wrought gears.

In the roll forming operating according to a presently preferred embodiment of the invention, the roll forming die 18 is mounted on the tool spindle 16 and the preform 14 is mounted on the workpiece spindle 12 so that their axes A, B lie transverse to one another with the outer periphery of the forming tool 18 adjacent the outer periphery of the preform 14.

The preform 14 and forming roll 18 are initially spaced from one another out of meshing engagement to accommodate the loading of the preform 14 onto the workpiece spindle 12. Either the workpiece spindle 12, tool spindle 16, or both are supported for lateral movement toward one another in the direction of arrow C (FIG. 1) in order to bring the forming roll 18 and preform 14 into forced meshing engagement with one another. The spindle 16 is coupled to a drive motor 42 which is operative to positively drive the spindle 16 and hence the forming roll 18 about the axis B in the direction of arrow D (FIG. 1) or in the opposite direction if desired, at an angular velocity $\omega_w$. The rotation of the forming roll 18 in the direction of arrow D imparts corresponding rotational force to the preform 14 urging it to rotate in the direction of arrow E (FIG. 1) due to engagement of the enmeshed thread 22 of the die 18 with the teeth 32 of the preform 14. In the preferred embodiment, the preform 14 is also positively driven by an associated motor 44 coupled to the workpiece spindle 12 to enable independent control of the relative rotation and angular velocity $\omega_g$ of the preform 14 for purposes which will be discussed below.

Figure 3:
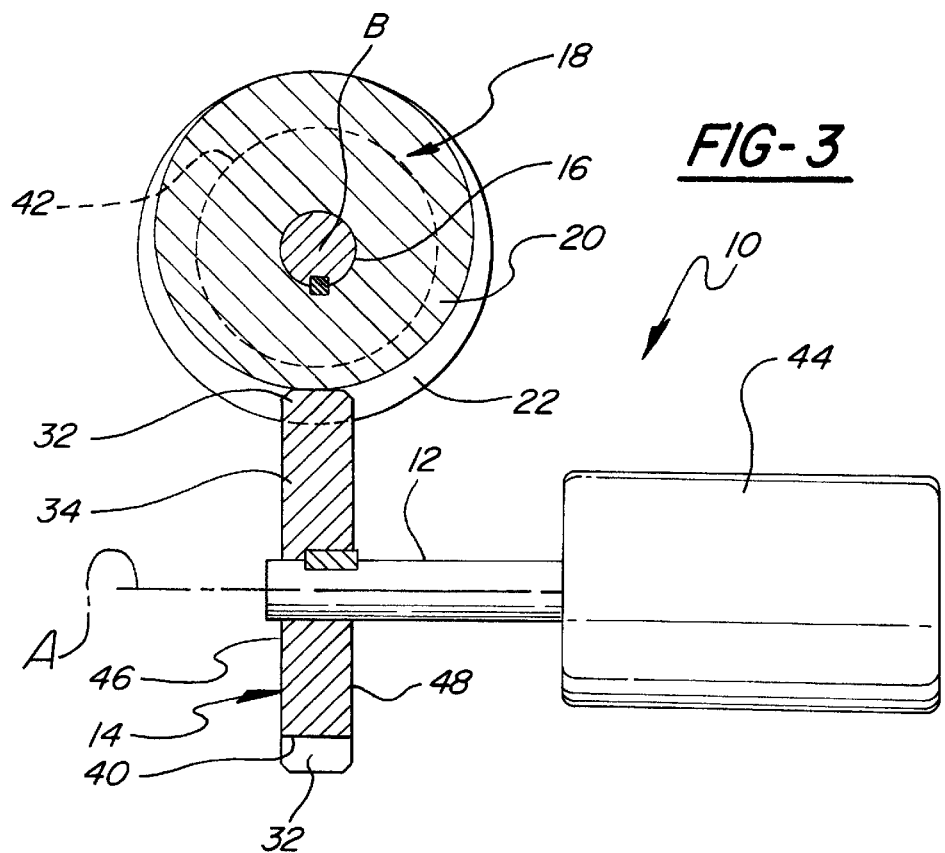
FIG. 3 is an enlarged fragmentary sectional view taken generally along lines 3—3 of FIG. 1.
Figure 4:
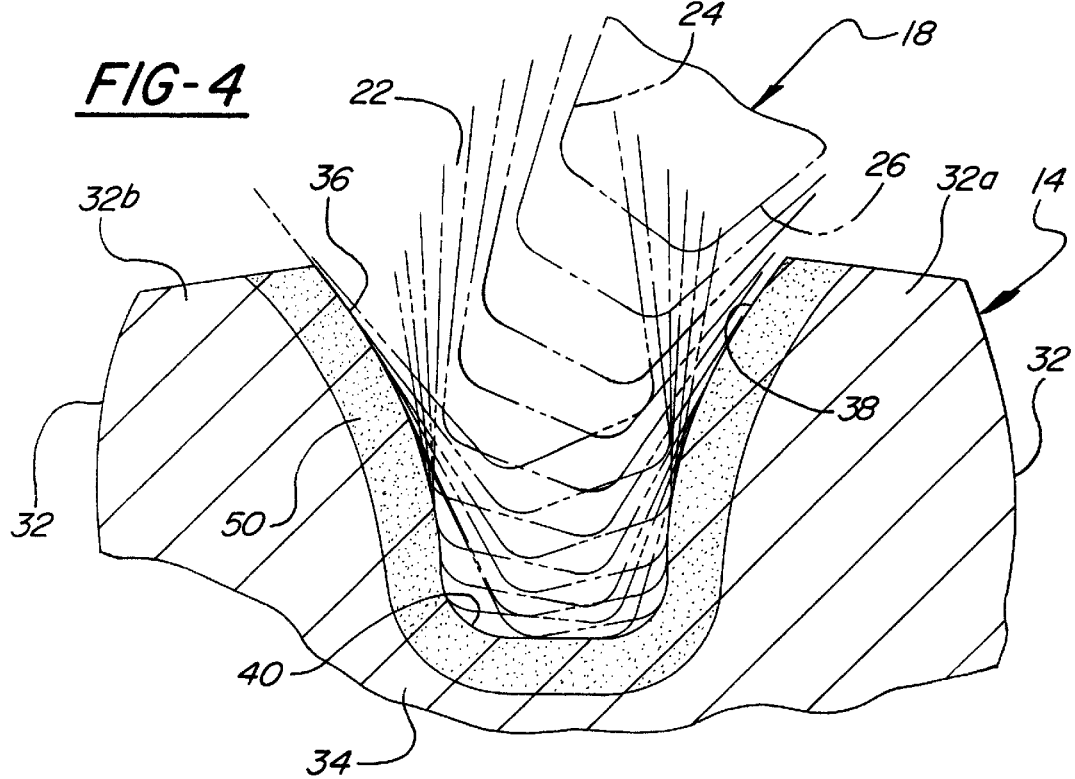
FIG. 4 is a further enlarged sectional view illustrating details of the interaction between the forming tool and gear preform.

FIGS. 2–4 illustrate the interaction that takes place between the worm thread 22 and the preform gear teeth 32 during roll forming that accounts for uniform, high densification of the teeth of a powder metal preform, or uniform burnishing of a wrought preform. Referring initially to FIGS. 2 and 4, as the worm thread 22 enters the space 40 between adjacent teeth of the preform 14, identified as 32a and 32b in FIG. 4, the leading wall 26 of the worm thread 22 initially contacts the trailing face 38 of the leading tooth 32a with respect to the direction of rotation E of the preform 14. As the die 18 rotates, the leading face 26 of the worm thread 22 progresses radially down the trailing face 38 of the tooth 32a and exerts a radially downward wiping action. In addition to the radial progression of the worm thread 22, the worm thread 22 traverses axially across the teeth 32 from one axial side 46 to the opposite axial side 48 of the gear preform 14 in the direction of arrow E (see FIG. 3), thereby imparting an axial wiping force in addition to the radial wiping force to the preform 14.

FIG. 4 illustrates, in stepped progression, the movement of the worm thread 22 between the adjacent teeth 32a, 32b. Continued rotation of the die 18 brings the trailing face 24 of the worm thread 22 into engagement with the leading face 36 of the trailing tooth 32b across the space 40, imparting the same radial and axial wiping force on the tooth face 36, but with the radial component being directed up (or radially outwardly) of the tooth 32b in the opposite direction. The radial and axial wiping contact of the worm thread acts on the oversized teeth 32 to displace the material of the preform 14 at the contacting surfaces of the teeth 32 without removing material to any significant degree (as in the sense of gear cutting operations). In the case of a powder metal preform, the resultant displacement of the preform material acts to densify and harden the teeth 32 to a predetermined depth as illustrated by the stipled regions of FIGS. 2 and 4. Full theoretical density is achievable to various depths, with the degree and depth of densification being dependent upon the particular application.

The same principles described above apply when roll forming a wrought preform, with the stipled region 50 representing the affected burnished zone resulting from the displacement of the preform material by the worm thread 22.

Positively driving the die 18 and preform 14 independently of one another enables adjustment in the directional loading applied by the thread 22 of die 18 on the teeth 32 of the preform 14. For example, slowing the rotational drive of the preform 14 relative to the normal rotation imparted by the die 18 acts to introduce resistance to the rotation of the preform 14 and thus increases the loading applied by the worm thread 22 on the trailing face 38 of the gear teeth 32. Increasing the rotational drive of the preform 14 correspondingly increases the load applied by the thread 22 on the leading face 36 of the gear teeth 32. Particular tooth forms can thus be generated by controlling the relative drive of the die 18 and preform 14. For producing an involute tooth form as illustrated in FIGS. 2 and 4, for example, the angular velocities $\omega_w$, $\omega_g$ are controlled such that the drive ratio $$\frac{\omega_w}{\omega_g} = \frac{N_g}{N_w}.$$

Adjusting the relative drive of the die 18 and preform 14 during a given gear rolling operation can be used to achieve other tooth forms and to produce uniform densification of the teeth or to density a particular selected region of the teeth 32 more or less than other regions.

Figure 5:
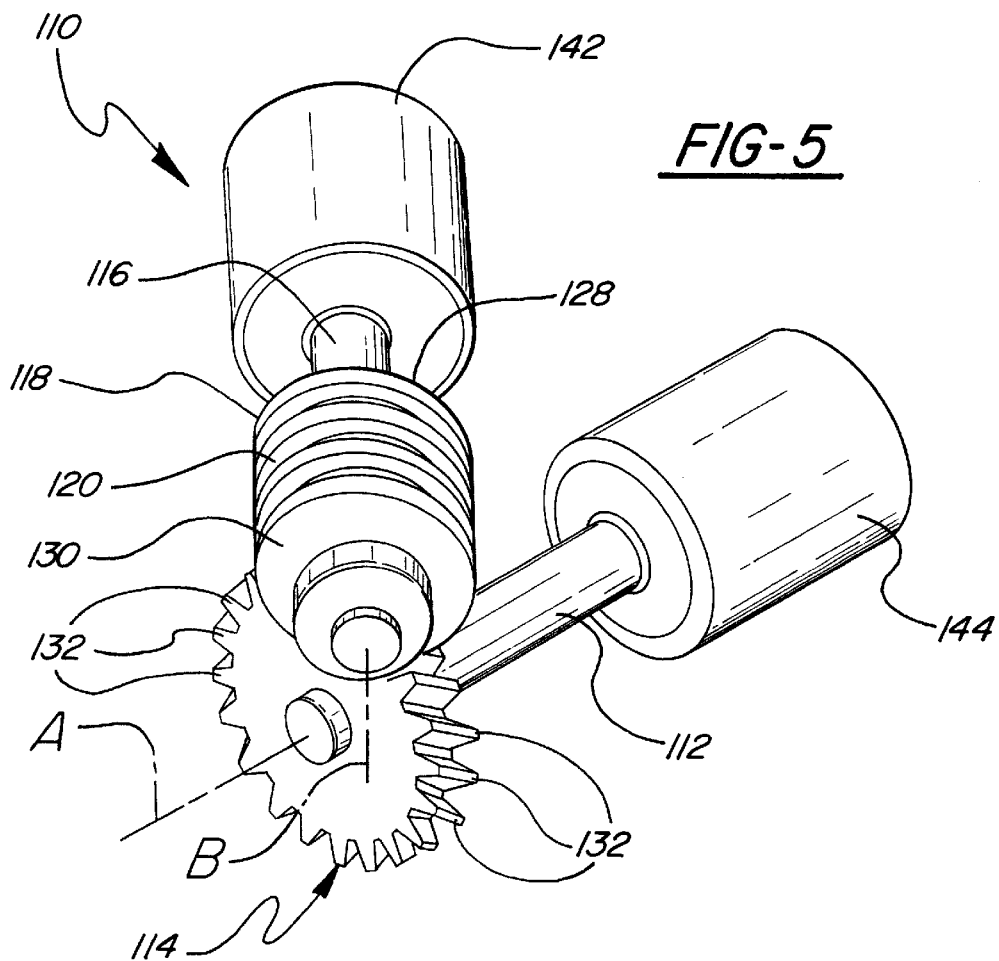
FIG. 5 is a schematic perspective view of a gear roll forming apparatus for forming helical gear teeth according to a second embodiment of the invention.

FIG. 5 shows an alternative arrangement of a roll forming apparatus 110 according to the invention, wherein like reference numerals are used to represent like features but are offset by 100. In this case, the preform 114 has a helical tooth form 132 that may have an involute profile representative of that shown in FIGS. 2 and 4 with respect to the preform 114. The same general set up is employed as that shown in FIG. 1, except that the angular relationship between the axes A, B is adjusted to accommodate the helical tooth form of the preform 114. In FIG. 1, the teeth 32 are parallel across the preform 14 with the axis A and the angle between the axes A, B is set at 90°. In FIG. 5, the helical teeth 132 are set at an angle to the axis A of the preform 114, and thus the angle between the axes A, B is adjusted to account for the helical tooth form such that the thread 122 of the die 118 interacts with the teeth 132 of the preform as described previously with respect to the first embodiment of FIGS. 1–4.

Figure 6:
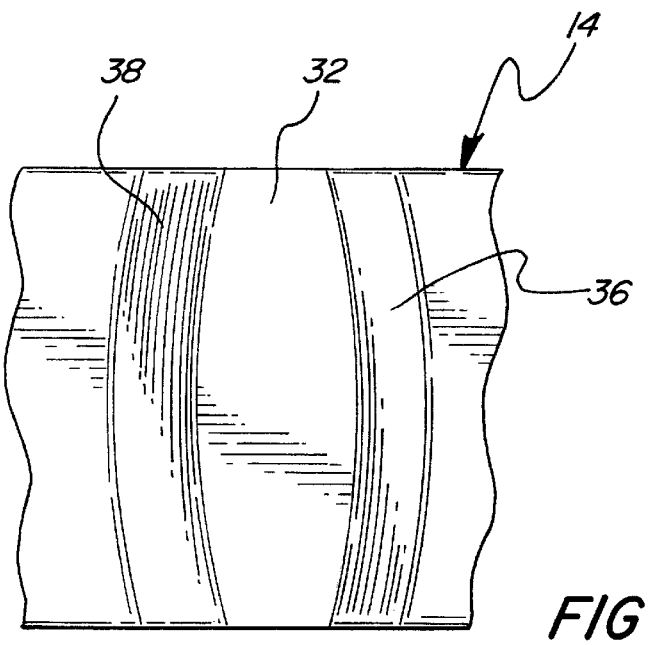
FIG. 6 is an enlarged fragmentary plan view of powder metal gear that has been roll form densified according to the invention having a crowned tooth profile.

FIG. 6 shows still a further alternative tooth form that may be generated by controlling the relative movements and drive of the die 18 and preform 14 including overdriving and underdriving the preform 14 relative to the movement imparted by the worm 12 during predetermined times of the roll forming cycle. FIG. 6 is a top or plan view looking down on the tip of a gear tooth 32 and it can be seen that the tooth 32 has a crowned profile such that it is narrow at its ends and is enlarged in the middle. Such a crowned tooth profile is not new per se with respect to the manufacture of wrought gears (i.e., gear cutting and shaping operations), but is not heretofore been known to be produced on a surface densified powder metal gear using a single rolling die through controlled relative movement and drive of both the die and gear preform as according to the present invention. The crowned tooth profile can be provided on helical gear teeth, spur gear teeth, etc.

According to another aspect of the invention, a convenient and cost-effective method of roll form densifying powder metal gear preforms of the invention is by modifying existing machine tools of the type that are traditionally used to cut gear teeth of wrought gears (e.g., hobbing and shaping machine tools) in such manner as to enable such machine tools to roll form density powder metal gear preforms.

The traditional gear cutting machine tools have a cutter head formed with a series of cutting surfaces or teeth which act to remove material from a wrought gear blank to form the gear teeth having any of a number of shapes and profiles, including spur gear teeth, helical teeth, involute profiles and crowned tooth profiles discussed above as well as these and others which are known by those skilled in the art of the manufacture and operation of gears. In a traditional gear hobbing machine used for cutting gear teeth of wrought gear blanks, the cutter or hob is in the form of a worm having a helical thread, across which are formed deep grooves revealing a number of cutting edges or surfaces of the thread which remove material from the gear blank to form the teeth of the gear. The formation of a particular gear tooth pattern or profile is controlled by the relative positioning and movements of the hob cutter and gear blank according to pre-programmed cutting operations. Similarly, gear cutters and shapers employ a rotating head with cutting edges or surfaces with act to remove material from the gear blank to form gear teeth.

According to the invention, such machines are modified by mounting the powder metal gear form on the spindle which would normally support a wrought gear blank, and replacing the cutting head with a roll forming die 18 according to the invention having a similar form as that of the cutting head but lacking the cutting surfaces. For example, FIGS. 1–6 schematically illustrate a modified gear hobbing machine having the roll forming die 18, 118 with a helical thread 22, 122 which extends continuously and lacks the deep grooves which a hob cutter has to provide cutting surfaces. Such cutting surfaces are purposely lacking from the roll forming die 18, 118 since the objective is to displace and density the preform material rather than cut and remove the material. Advantageously, the programming normally used to operate the machine tool to cut a particular gear tool form can be used to operate the roll forming die 18, 118 to density the powder metal preforms 14 according to the invention, with adjustment as necessary in the relative drive and movements of the roll forming die 18, 118 and powder metal preform 14, 114, to achieve the desired densification profile of the teeth as previously described.

Accordingly, the invention further contemplates a roll forming die having the general shape of a cutting head for gear cutting operations, but lacking the cutting edges or surfaces.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of modifying a gear cutting machine tool normally equipped with a gear cutting die to facilitate roll form densification of the teeth of powder metal fear preforms; comprising:

supporting a sintered powder metal gear preform having preformed teeth on a workpiece spindle of the machine tool for rotation about a first axis;

replacing the gear cutting die of the machine tool with a roll forming die supported on a tool spindle for rotation about a second axis transverse to the first axis and having a roll forming surface substantially free of cutting features that would act to remove material from the preform during a roll forming operation;

bringing the roll forming surface into meshing engagement with the teeth of the preform;

fixing the transverse angular orientation of the first axis relative to the second axis;

positively driving the tool spindle and roll forming die about the second axis to impart synchronous driven rotation of the preform about the first axis; and while driving the roll forming die about the second axis, positively driving the preform about the first axis out of sync with the drive of the roll forming die thereby to impart binding interference between the roll forming die and the preform sufficient to cause displacement and material densification of the teeth of the powder metal preform.

2. The method of claim 1 wherein the die and preform are separately driven such that:

$$\frac{\omega_w}{\omega_g} = \frac{N_g}{N_w},$$

where $N_g$ is the number of gear teeth formed on the preform, $N_w$ is the number of worm threads of the rolling die, $\omega_g$ is the angular velocity of the preform, and $\omega_w$ is the angular velocity of the rolling die.

3. Apparatus for roll forming sintered powder metal gear preforms comprising:

a workpiece support spindle rotatable about a first axis;

a sintered powder metal gear preform having gear teeth mounted for rotation on said workpiece support spindle;

a roll forming tool having a helical worm thread free of cutting surfaces;

a tool spindle mounting said roll forming tool for rotation about a second axis transverse to said first axis with said worm thread of said roll forming tool in meshing engagement with the teeth of the preform;

a drive mechanism coupled to said tool spindle operative to drive said tool spindle and said roll forming tool about said second axis to impart synchronous driven rotation of said preform about said first axis;

a drive mechanism coupled to said workpiece support spindle operative to positively drive said workpiece support spindle and said preform about said first axis; and a control system communicating with said drive mechanisms for simultaneous operation of said drive mechanisms in such manner that said preform is driven out of sync with the drive imparted thereto by the said driven roll forming tool so as to impart binding rotational interference between said roll forming tool and said preform sufficient to displace and density the material of the teeth of said preform.

4. The apparatus of claim 3 wherein said drive mechanisms comprise independent drive motors.

* * * * *

UNITED STATES PATENT AND TRADEMARK OFFICE
CERTIFICATE OF CORRECTION

PATENT NO. : 6,151,778
DATED : November 28, 2000
INVENTOR(S) : Richard Mark Woolf, Juan R. L. Trasorras It is certified that error appears in the above-identified patent and that said Letters Patent is hereby corrected as shown below: ON THE TITLE PAGE section [75], change "Cincinmnati" to --Cincinnati--.
Column 1, line 31, change "density" to --densify--.
Column 2, line 40, change "densities" to --densifies--.
Column 2, line 57, change "density" to --densify--.
Column 4, line 13, change "power" to --powder--.
Column 5, line 49, change "density" to --densify--.
Column 6, line 55, change "density" to --densify--.
Column 6, line 59, change "density" to --densify--.
Column 8, line 35, change "density" to --densify--.

Signed and Sealed this

Eighth Day of May, 2001

Attest:

NICHOLAS P. GODICI

Attesting Officer — Acting Director of the United States Patent and Trademark Office